(12) United States Patent
Takeuchi

(10) Patent No.: US 7,575,107 B2
(45) Date of Patent: Aug. 18, 2009

(54) BRAKE DISC

(75) Inventor: Hitoshi Takeuchi, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 11/953,622

(22) Filed: Dec. 10, 2007

(65) Prior Publication Data

US 2008/0257663 A1    Oct. 23, 2008

Related U.S. Application Data

(62) Division of application No. 10/575,614, filed as application No. PCT/JP2004/015420 on Oct. 19, 2004, now Pat. No. 7,374,025.

(30) Foreign Application Priority Data

Oct. 23, 2003    (JP)    ............................. 2003-363543

(51) Int. Cl.
    *F16D 65/12* (2006.01)
(52) U.S. Cl. ............................. 188/218 XL; 188/218 A
(58) Field of Classification Search ............. 188/218 A, 188/218 XL
    See application file for complete search history.

(56) References Cited

U.S. PATENT DOCUMENTS

| | | | |
|---|---|---|---|
| 5,632,362 A | 5/1997 | Leitner | |
| 5,848,674 A | 12/1998 | Johnson et al. | ........... 188/18 A |
| 6,003,639 A | 12/1999 | Buckley et al. | ............... 188/26 |
| 6,135,248 A | 10/2000 | Johnson et al. | |
| 6,530,457 B1 | 3/2003 | Nago et al. | ................... 188/26 |
| 6,964,323 B2 | 11/2005 | Campbell | ................. 188/18 A |

FOREIGN PATENT DOCUMENTS

| | | |
|---|---|---|
| DE | 3814680 | 11/1989 |
| JP | 55-028190 | 2/1980 |
| JP | 58-013237 | 1/1983 |
| JP | 11-022761 | 1/1999 |
| JP | 2000-329177 | 11/2000 |
| JP | 2001-182764 | 7/2001 |
| JP | 2001-208114 | 8/2001 |
| WO | WO 2004088162 | 10/2004 |

*Primary Examiner*—Christopher P Schwartz
(74) *Attorney, Agent, or Firm*—Hogan & Hartson LLP

(57) ABSTRACT

A brake disc capable of sufficiently absorbing thermal stress associated with thermal expansion and deformation of the braking section. The brake disc includes a mounting section for attachment to a wheel, a braking section located at the outside circumference of the mounting section for brake pads to be brought into sliding contact therewith, and a connecting arm section for connecting each of the plurality of mounting portions of the mounting section and the braking section. Connecting arms in the connecting arm section each extend from their respective ones of the plurality of mounting portions in one side direction different from the radial direction of the braking section to reach the braking section, and adjacent mounting portions are connected to each other at least through a connecting arm.

12 Claims, 10 Drawing Sheets

(a)

(b)

(a)

(b)

BRAKE DISC

CROSS-REFERENCE TO RELATED APPLICATIONS

This application is a divisional of U.S. application Ser. No. 10/575,614, having a 35 USC 371(c) date of Apr. 9, 2007, which is a national stage entry of PCT/JP04/15420, having an international filing date of Oct. 19, 2004. This application also claims the benefit of priority in Japanese application no. 2003-363543, filed on Oct. 23, 2003. The contents of each of these applications are hereby incorporated by reference in their entireties.

BACKGROUND OF THE INVENTION

1. Field of the Invention

This invention relates to a brake disc and particularly to a brake disc for a motorcycle.

2. Description of Related Art

In vehicles, such as motorcycles, a disc brake has been widely in use as a control device. In such a disc brake device, a brake disc is mounted to a wheel hub of a front or rear wheel of the vehicle. A caliper having brake pads therein is provided on the body frame side of the brake disc at the outside circumferential portion thereof. The brake pads are pressed against the brake disc from both sides by hydraulic pistons, and friction created between the brake disc and the pads can brake rotation of the disc.

In such a disc brake device, since the temperature of the brake disc is raised by the frictional heat to cause thermal deformation, such as warping of the disc, it is necessary to dissipate frictional heat for improving a heat dissipation property so as to prevent deformation such as warping of the disc.

In conventional devices, numerous holes are provided in the brake disc to facilitate heat dissipation. To further improve the heat dissipation property for suppressing thermal deformation, one brake disc has been proposed in Japanese Patent Document JP-A-Hei08-210466. Referring to FIG. 8, the configuration of the brake disc disclosed in the foregoing patent document will be described.

Brake disc 110 shown in FIG. 8 is a modified disk of a configuration disclosed in FIG. 16 of JP-A-Hei08-210466. Brake disc 110 comprises a hub section 113 with a round and inside circumference, an annular braking section 114, and a plurality of arm sections 115 connecting the hub section 113 and the braking section 114.

More specifically, the brake disc 110 is formed integrally of a carbon steel plate, and comprises the hub section 113 having a fitting hole 112 for an axle to pass through, the annular braking section 114 on the outside circumferential side, and a plurality of arm sections 115 connecting the hub section 113 and braking section 114 circumferentially at a certain interval.

The braking section 114 is formed with a plurality of slots 116 at a certain interval, and a center Q1 of the head on the outside circumferential side of each connecting section 117 disposed between slits 116 is offset from a center Q2 of its base on the inside circumferential side by a fixed angle α in the circumferential direction. Between the braking section 114 and hub section 113 are formed alternately arm sections 115 and reduction holes 118 for reduction of weight. The hub section 113 is formed, near the bases of the arm sections 115, with mounting holes 111 for fixing the brake disc.

The plurality of arm sections 115 are provided such that centers P10 of their heads on the braking section 114 side and centers P11 of their bases on the hub section 113 side are offset in one circumferential direction by displacement angles θ10, θ11 and θ12 in this order repeatedly. Center lines L10 of the arm sections 115 are disposed oblique in one direction to radial line segments of the brake disc 10 crossing these center lines. Also, in every part of each arm section 115 along its entire length is provided a longitudinal line segment L12 crossing the arm section 115 radially of the brake disc 10 to prevent direct connection of the hub section 113 and braking section 114.

Now, referring to FIGS. 9(A) and (B), operation of the brake disc 110 is described. Since the centers P10 of the heads of the arm sections 115 and the centers P11 of their bases are offset in one circumferential direction by displacement angles θ10, θ11 and θ12 in this order repeatedly and the arm sections 115 are disposed oblique to the radial line segments of the brake disc 110, the expansion of the braking section 114 in the radial direction, as shown in FIG. 9(A) by phantom lines, is transformed into the elastic deformation of the arm sections 115, and the contraction of the braking section 114 in the radial direction, as shown in FIG. 9(B) by phantom lines, is transformed into the elastic deformation of the arm sections 115.

That is, in the case where heat generation during braking causes expansion of the braking section 114, even if radial tensile stresses F12 are exerted on the arm sections 115, as shown in FIG. 9(A), these tensile stresses F12 are absorbed by the arm sections 115 and reduction holes 118 being deformed as shown by the phantom lines. Also, even if radial compressive stresses F11 are exerted on the arm sections 115 as a result of contraction of the braking section 114 by the heat treatment applied to the braking section 114 during manufacturing of the brake disc 10, as shown in FIG. 9(B), these compressive stresses F11 are absorbed by the arm sections 115 and reduction holes 118 being deformed as shown by the phantom. lines. Therefore, compressive stresses on the hub section 113 are decreased, deformation of the hub section 113 toward its center is prevented, and the sufficient roundness of the fitting hole 112 can be achieved without machining or the like after heat treatment.

In the brake disc disclosed in JP-A-Hei08-210466, thermal stress causing compressive force or tensile force exerted on the hub section are decreased without need of a complicated structure of the brake disc, and deformation of the inside circumferential surface of the hub section or warping of the whole disc can be effectively prevented for the transmission of braking force.

However, since in the brake disc of JP-A-Hei08-210466, at least an annular hub section is considered as an essential component while prevention of deformation of the inside circumferential surface of the hub section is pursued, it is difficult to expect further elastic deformation of the arm sections. That is, there is provided an arm section (connecting arm) extending from an arcuate portion connecting adjacent mounting holes in the annular hub section to a ring section, so that elastic deformation of the arm section is suppressed, which may provide a case where the brake disc as a hole is unable to absorb sufficiently thermal stress due to thermal expansion of the braking section.

SUMMARY OF THE INVENTION

In view of the foregoing drawbacks, the main object of this invention is to provide a brake disc capable of absorbing sufficiently thermal stress associated with thermal expansion and deformation of the braking section.

A brake disc of this invention comprises a mounting section for the attachment to a wheel, a braking section located at the outside circumference of the mounting section for brake pads to be brought into sliding contact therewith, and a connecting arm section for connecting each of the plurality of mounting portions of the mounting section and the braking section. Connecting arms in the connecting arm section each extend from their respective ones of the plurality of mounting portions in one side direction different from the radial direction of the braking section to reach the braking section, and adjacent mounting portions are connected to each other at least through the connecting arm.

In a preferred embodiment, the mounting section is formed with mounting holes.

In a preferred embodiment, the braking section and the connecting arm section are arranged such that braking force is applied to the braking section by frictional heat when the brake pads are brought into sliding contact with the braking section, and the whole of the connecting arm section is deformed due to thermal expansion during braking of the braking section.

In a preferred embodiment, the connecting arm extending from one of the mounting portions to the braking section is constituted by one connecting arm.

In a preferred embodiment, the connecting arm extending from one of the mounting portions to the braking section is constituted by at least two connecting arms.

In a preferred embodiment, at least one connecting arm extending from the one mounting portion is branched in the middle to reach a plurality of locations of the braking section.

In a preferred embodiment, the connecting arm extending from the one mounting portion is connected, by a reinforcement arm, to a mounting portion located in one side direction of the mounting portion.

At least two connecting arms extending from the one mounting portion include connecting arms of different lengths, and at least one connecting arm other than a shortest connecting arm is preferably connected, by a reinforcement arm, to a mounting portion located in one side direction of the mounting portion.

In a preferred embodiment, the shape of an opening which is defined by the mounting portions, the connecting arms and the reinforcement arms and located centrally of the brake disc, is a polygon.

In a preferred embodiment, the polygon is approximately a regular hexagon.

In a preferred embodiment, the braking section is formed with a plurality of small holes.

The brake disc is preferably a brake disc for a motorcycle.

The vehicle of this invention is a vehicle equipped with the brake disc. The vehicle is, for example, a motorcycle, a snowmobile or a four-wheeled buggy.

The brake disc of an embodiment according to this invention comprises a braking section to which braking force is applied by frictional heat when brake pads are brought into sliding contact with its end portion on the outside circumferential side. A plurality of mounting portions are formed on the center side relative to the braking section and are used to mount the brake disc to a wheel. A plurality of connecting arms connect these mounting portions to the braking section and is constituted such that the whole of the connecting arm section can be deformed by heat expansion during braking of the braking section.

In a preferred embodiment, the connecting arm section includes a plurality of connecting arms extending from a single mounting portion and is constituted such that the plurality of connecting arms extending from the single mounting portion can each be deformed into different shapes.

In a preferred embodiment, at least some of the connecting arms are provided with reinforcement arms branched from the connecting arms and the reinforcement arms are constituted such that they can be deformed in association with deformation of their connecting arms.

In a preferred embodiment, a reinforcement arm, which is branched from an easy-to-deform connecting arm among the plurality of connecting arms extending from the single mounting portion, is provided, and the reinforcement arm is constituted such that it can be deformed in association with deformation of its connecting arm.

In a preferred embodiment, the plurality of mounting portions are connected to each other only through the connecting arms.

In a preferred embodiment, the connecting arms are connected to the braking section at positions in one rotational direction of the disc from the mounting portions to which these connecting arms are connected.

In a preferred embodiment, the connecting arms are each formed narrower in width than their respective mounting portions and larger in length than in width.

In a preferred embodiment, the plurality of connecting arms extending from the single mounting portion include connecting arms of different lengths.

In a preferred embodiment, a reinforcement arm is branched from a long connecting arm among the connecting arms of different lengths.

In a preferred embodiment, the reinforcement arm is formed shorter than the connecting arm from which it is branched.

In a preferred embodiment, the reinforcement arm is connected to an adjacent mounting portion.

In a preferred embodiment, the reinforcement arm is connected to the braking section.

In a preferred embodiment, a reinforcement arm is provided which is branched from the reinforcement arm.

Another brake disc of an embodiment according to this invention comprises a braking section to which braking force is applied by frictional heat when brake pads are brought into sliding contact with its end portion on the outside circumferential side. A plurality of mounting portions are formed on the center side relative to the braking section and are used to amount the brake disk to a wheel. A plurality of connecting arms connect these mounting portions to the braking section. The plurality of mounting portions are connected to the braking section only through the connecting arms, and all of the connecting arms are connected to the braking section at positions in one rotational direction of the disc from the mounting portions to which the connecting arms are connected.

In a preferred embodiment, the connecting arms are each formed narrower in width than their respective mounting portions, and larger in length than in width.

Still another brake disc of an embodiment according to this invention comprises a braking section to which braking force is applied by frictional heat when brake pads are brought into sliding contact with its end portion on the outside circumferential side. A plurality of mounting portions are formed on the center side relative to the braking section. A plurality of connecting arms connect these mounting portions to the braking section. The plurality of mounting portions are connected to each other only through the connecting arms. All of the connecting arms are formed narrower in width than their respective mounting portions and larger in length than in width.

In a preferred embodiment, the connecting arm section includes a plurality of connecting arms extending from a single mounting portion, and the plurality of connecting arms extending from the single mounting portion include connecting arms of different lengths.

In a preferred embodiment, at least some of the connecting arms are provided with reinforcement arms branched from the connecting arms.

In a preferred embodiment, the connecting arm section includes a plurality of connecting arms extending from a single mounting portion. The plurality of connecting arms extending from the single mounting portion include connecting arms of different lengths. A reinforcement arm is branched from a long connecting arm among the connecting arms of different lengths.

In a preferred embodiment, the reinforcement arm is formed shorter than the connecting arm from which it is branched.

In a preferred embodiment, the reinforcement arm is connected to an adjacent mounting portion.

In a preferred embodiment, the reinforcement arm is connected to the braking section.

In a preferred embodiment, a reinforcement arm is branched from the reinforcement arm.

In the brake disc of this invention, connecting arms for connecting a mounting section for the attachment to a wheel and a braking section located at the outside circumference of the mounting section each extend in one side direction different from the radial direction of the braking section to reach the braking section. Adjacent mounting portions are connected at least through the connecting arms. Therefore, binding of the connecting arm section by an annular hub section is relaxed, and thus, the brake disc as a whole is able to absorb sufficiently thermal stresses due to thermal expansion of the braking section.

DETAILED DESCRIPTION OF THE INVENTION

Figure 1:
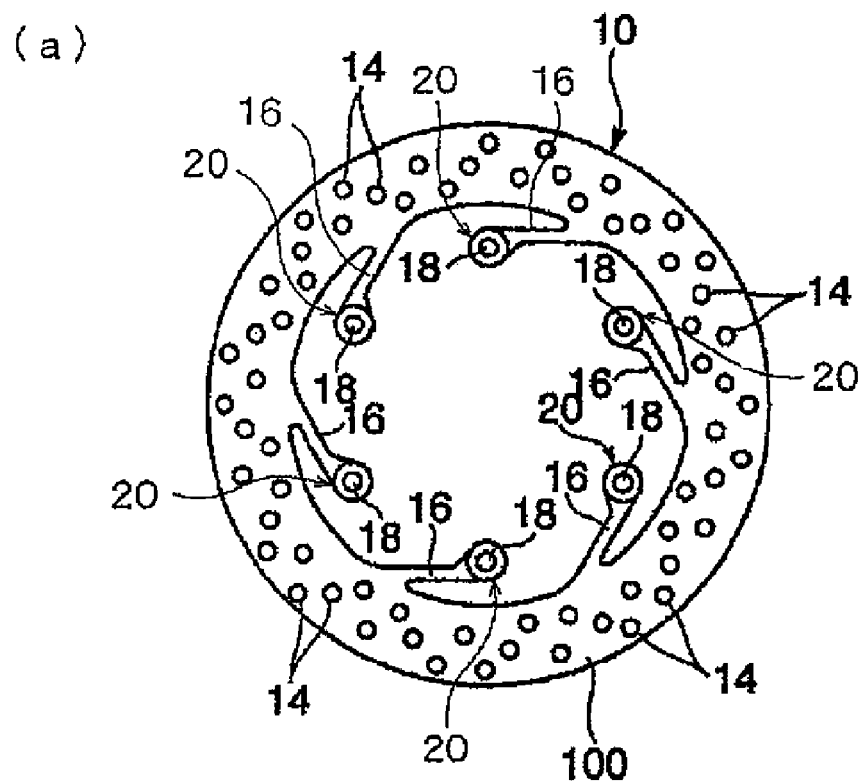
FIG. 1 includes front views of a brake disc of an embodiment according to this invention.
Figure 1:
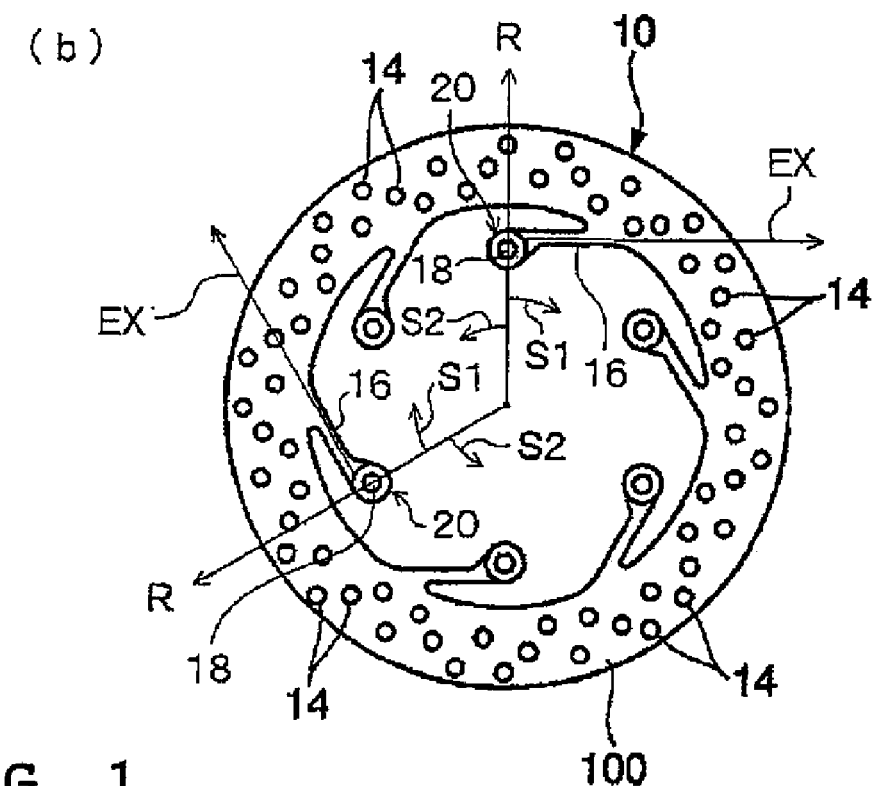

The inventor of the present application has devised, as a result of earnest study to find out the possibility of satisfactory absorption of thermal stress associated with thermal expansion and deformation of the braking section, a configuration based on a technical concept, which precludes adoption of an annular hub, in place of the configuration of the conventional brake disc, which leads to this invention.

An embodiment according to this invention is described below with reference to the drawings. It is to be understood that this invention is not limited to the following embodiment.

EMBODIMENT 1

Referring to FIGS. 1(A) and (B), a brake disc according to embodiment 1 of this invention will be described. FIG. 1(A) is a front view schematically showing the configuration of the brake disc 10 of this invention, and FIG. 1(B) is a view, illustrating an arrangement of a connecting arm section of the brake disc 10.

The brake disc 10 of this embodiment, as shown in FIGS. 1(A) and (B), includes a mounting section 20 for the attachment to a wheel (not shown); a braking section 100 for brake pads (not shown) to be brought into sliding contact therewith; and a connecting arm section 16 for connecting the mounting section 20 to the braking section 100. The mounting section 20 is formed with mounting holes 18. This invention is not limited to the mounting holes 18, but, for example, pins may be used if they serve as a means for attaching the brake disc to the wheel. The braking section 100 is located at the outside circumference of the mounting section 20.

The connecting arms 16 extend from the mounting sections 20, respectively, in the direction (EX) different from the radial direction (R) of the braking section 100 to reach the braking section 100, and the direction (EX) in which each connecting arm 16 extends, is equal to one side direction (S1). Here, the one side direction (S1) indicates the direction opposite the other side direction (S2), and the term "one side direction (S1)" may be referred to as "one side of circumferential directions of the braking disc 10" (that is, a clockwise direction in the example of FIG. 1(B)) or may be referred to as a rightward direction as seen from the radial direction (R). The direction (EX) in which each connecting arm 16 extends, may be the direction of S2 (a counterclockwise direction or a leftward direction) and in that case, S2 has a meaning of one side direction.

Figure 8:
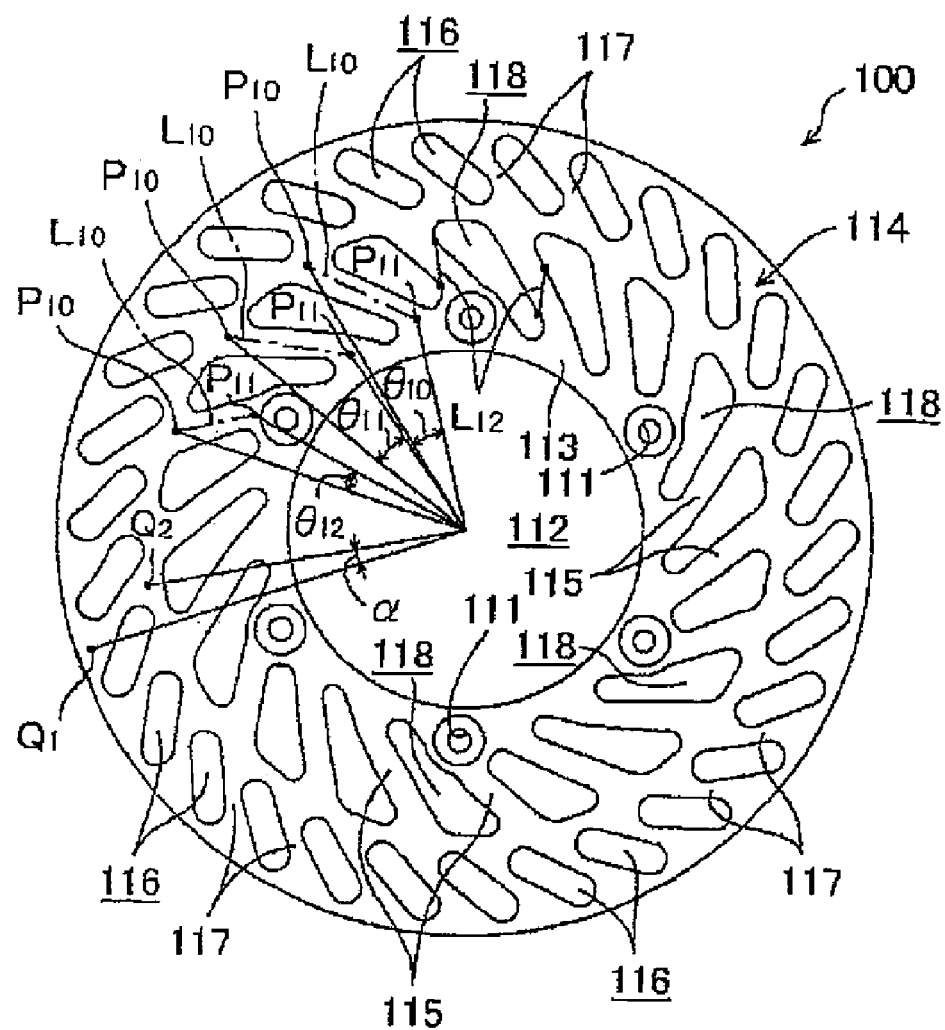
FIG. 8 is a front view of a conventional brake disc.

In the arrangement of this embodiment, adjacent mounting portions 20 are connected at least through the connecting arms 16. That is, in the brake disc 10 of this embodiment, unlike the brake disc 110 shown in FIG. 8, there is no annular hub section 113, and the adjacent mounting portions 20 are connected not by the annular hub section but at least through the connecting arms 16. In the example shown in FIG. 1, one mounting portion 20 and another mounting portion 20 adjacent to the one mounting portion are connected by a connecting arm 16 extending from the one mounting portion 20, the braking section 100 connected by the connecting arm 16, and the adjacent mounting portion 20.

During operation of the brake disc 10, braking force is applied to the braking section 100 by frictional heat when the brake pads are brought into sliding contact with the brake disc. The mounting portions 20 and the connecting arms 16 are arranged such that the whole connecting arm section 16 is deformed by thermal expansion during braking of the braking section 100. That is, in the arrangement of this embodiment, since there is no annular hub section, the whole connecting arm section 16 positively changes its shape without any restriction of the annular hub section so that thermal stress associated with thermal expansion and deformation of the braking section 100 can be sufficiently absorbed.

In the example shown in FIG. 1, the connecting arm 16 extending from one mounting portion 20 to the braking section 100 is constituted by one connecting arm 16. A configuration may be adopted in which one connecting arm 16 is branched in the middle to reach a plurality of locations of the braking section 100.

Figure 2:
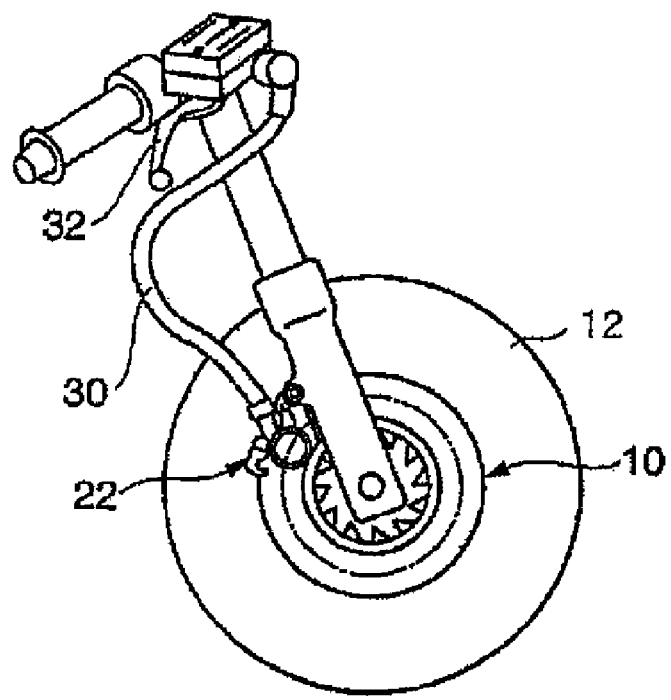
FIG. 2(A) is a perspective view of the front wheel section of a vehicle (motorcycle) to which the brake disc of the embodiment according to this invention is applied.
FIG. 2(B) is a schematic view, illustrating a brake system provided on the front wheel.
Figure 2:
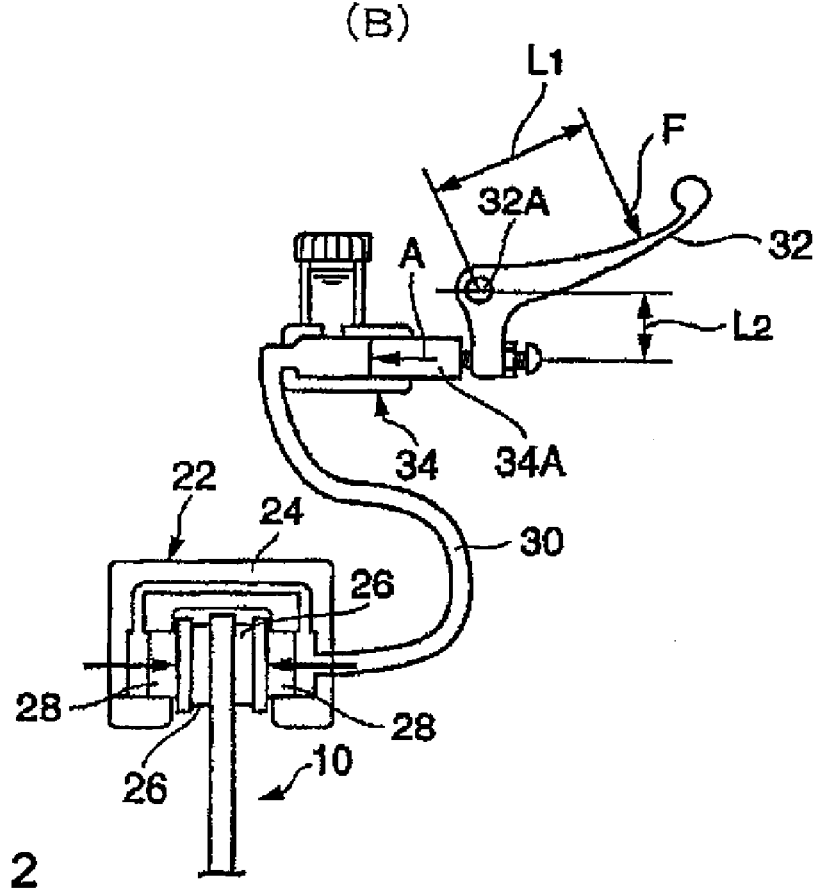

The arrangement of this embodiment is described further with reference to FIGS. 2(A) and (B) in addition to FIG. 1. FIG. 2(A) is a perspective view of the front wheel section of a vehicle (motorcycle) to which the brake disc 10 of this embodiment is applied, and FIG. 2(B) is a schematic view, illustrating a brake system provided on the front wheel.

The brake disc 10 shown in FIG. 1 is a brake disc applied to a motorcycle, assuming a thin, ring-like disc structure. The brake disc 10 is not limited to motorcycles but applicable to other vehicles, for example, to so-called straddle type vehicles (snowmobiles and four-wheeled buggies (ATV: all terrain vehicles) or the like) in addition to motorcycles. The motorcycle in this embodiment means a motorcycle, including a motor-bike and a scooter and refers specifically to a vehicle capable of turning with its body tilted. Therefore, even if the vehicle has no fewer than two wheels for at least one of its front and rear wheels and called a three-wheeler or a four-wheeler (or more), it can be included in a "motorcycle."

As shown in FIG. 2(A), the brake disc 10 is attached to the axle of a wheel 12 (see FIG. 2(A)) coaxially therewith and rotates with the wheel 12. The brake disc 10 is attached on one side or on both sides of the wheel 12 depending on the type of the vehicle.

As shown in FIG. 1, the brake disc 10 is provided with a plurality of small holes 14. The small hole 14 has a function of releasing heat generated during braking. The small hole 14 may be any shape if it is able to fulfill its heat releasing function, and it is not limited to a circular shape but may be of different shapes.

In the arrangement shown in FIG. 1, an arm 16 extends as a connecting arm, while inclined tangentially or approximately tangentially, toward the center of the disc from each of six points of the brake disc 10 at which its inside circumferential side edge in the shape of a concentric circle is divided into equal parts. Six arms 16 are separate from each other without being connected through the conventional annular hub section.

The arm 16 is formed, at its end, with a round hole 18. The round hole 18 corresponds to a fixing portion (mounting portion) 20 for the brake disc to be attached to a wheel. That is, six female screws are provided in advance at regular intervals in a circle on the wheel 12 shown in FIG. 2(A), and the brake disc and the wheel are fastened with bolts (not shown), with each of the female screws and the round hole 18 of the fixing portion 20 aligned to each other. Thus, brake disc 10 is fixed to the wheel 12.

As shown in FIG. 2(B), a caliper 22 is disposed such that the outside circumferential edge (braking section 100 of FIG. 1) of the brake disc 10 is held by the caliper. The caliper 22 is provided with a pair of brake pads 26 inside a caliper body 24, and the brake pads 26 face the brake disc 10 at both sides. The brake pads 26 are affixed to the ends of caliper pistons 28 supported by the caliper body 24, respectively. The braking section is a specified region in the brake disc where frictional heat is generated when the brake pads are brought into sliding contact with the brake disc.

The caliper pistons 28 are supplied with oil of a specified pressure from a brake hose 30, and pressed in directions in which they approach to each other when the pressure is raised. As a result, the pair of brake pads are adapted to hold the brake disc 10 therebetween by the oil pressure. This holding condition is the one in which the brake is applied, and braking force is applied to the brake disc 10 which is rotating at high speed with the wheel.

Referring to a front brake of a motorcycle as an example, braking operation is described below. That is, as shown in FIG. 2(B), when a brake lever 32 is turned in the direction of arrow F by gripping force (when the brake lever 32 is gripped), a piston 34A of a master cylinder 34 is pressed in the direction of arrow A. At this time, the pushing force (pressure) on the piston 34A is magnified higher than the gripping force F on the brake lever by a factor of the lever ratio (L1/L2 shown in FIG. 2(B)).

This lever ratio is a so-called leverage determined by the offset quantity (L1) between a pivot shaft 32A of the brake lever 32 and the axis of the master cylinder 34 and the distance (L2) between the pivot shaft 32A of the brake lever 32 and the point of force at which the gripping force F is applied.

Oil pressure produced by pressing the piston 34A of the master cylinder 34 passes through the brake hose 30 and turns into a force to press the caliper pistons 28.

In the brake system described above, if a driver grips the brake lever 32 to brake the wheel 12 during rotation thereof at a high speed, the brake pads 26 hold the brake disc therebetween and the rotational speed of the wheel 12 is reduced by sliding friction. In the course of the braking operation, the brake disc 10 generates heat by friction. The brake disc 10 causes deformation due to thermal expansion with the heat.

When the brake disc 10 is attached to the wheel 12, a fixing section 20 to the wheel 12 is provided at the ends of arms 16 extending radially inwardly of the brake disc in the tangential direction and the fixing section 20 is defined as a fixing position. Since all the arms 16 are separate from adjacent arms and unlike the conventional arms, they are not bound by an annular hub section. The arm section tends to be deformed in association with thermal expansion and deformation of the braking section. Therefore, when the braking section of the brake disc generates heat by braking and increases its diameter as a result of the thermal expansion and deformation, no strains are accumulated in the brake disc, thereby preventing plastic deformation of the brake disc.

The inclination angle of the arm 16, the length of the arm 16, the shape of the arm 16 and the like are selected as appropriate to suit the thermal deformability required to the arm 16. On the other hand, the configuration of the arm 16 is determined, taking account of the strength required for the arm 16.

The arm 16 is configured such that the whole of the arm section 16 can be deformed due to thermal expansion of the braking section 100. The fixing portion 20 is provided on the arm 16 radially inwardly of the disc. In this embodiment, a plurality of fixing portions 20 are connected to the braking section 100 only through arms 16, respectively. Further, each arm 16 is connected to the braking section 100 at a position on one side (that is, "S1" of FIG. 1(B)) of the rotational direction of the disc brake 10 from a fixing portion 20 at the end of the arm 16. That is, the plurality of arms 16 are each inclined toward the same side (S1) (in a radial direction or a circumferential direction of the brake disc) relative to the braking section 100. Since the arms 16 extend toward the same side (one side), effective deformation can be achieved as a result of cooperation. The arm in the figure is shown as being straight, but may be bent. The arm 16 has a width smaller than the diameter of the fixing portion 20. The arm is formed such that its length is larger than the width of the arm 16 itself.

Variations of this embodiment will be shown in the following. As described above, like similar as in the foregoing embodiment are designated by similar reference numerals and the description is repeated.

Variation 1

Figure 3:
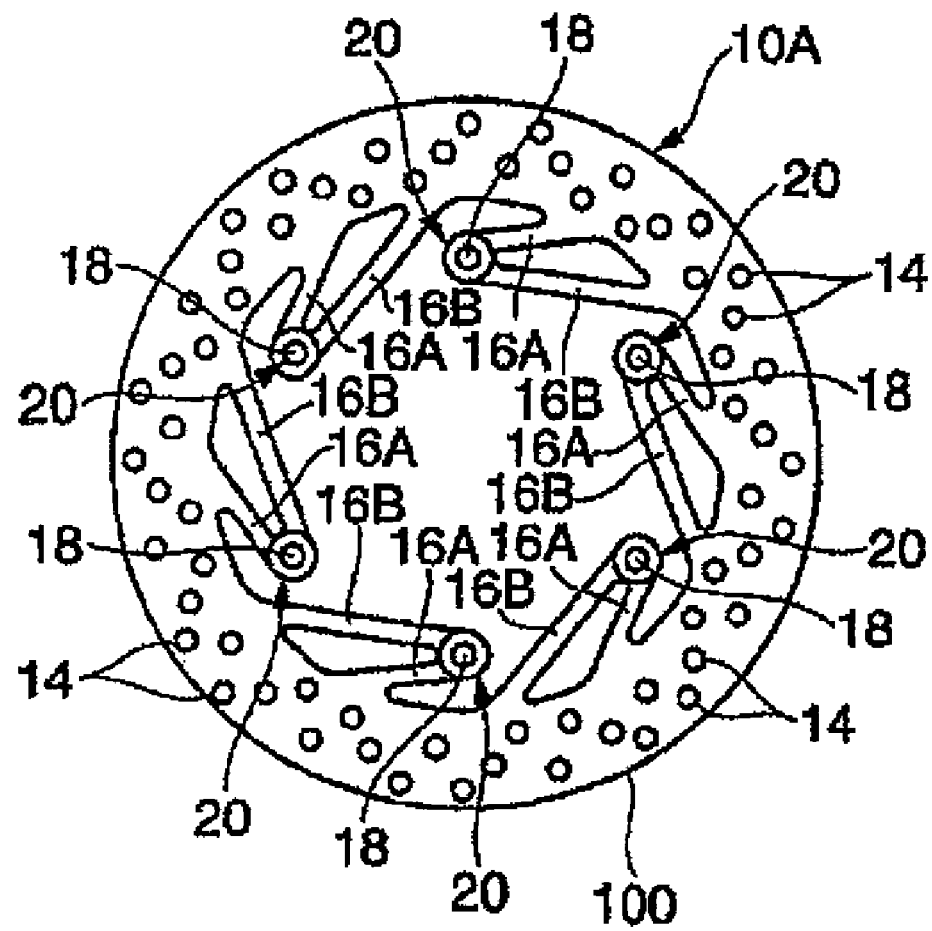
FIG. 3 is a front view of a brake disc of variation 1 according to the embodiment of this invention.

As shown in FIG. 3, in a brake disc 10A of this variation 1, the arm is formed of two frames 16A, 16B combined in a triangular shape. That is, the arm may be divided into a plurality of frames. In FIG. 3, the arm is made up of two frames, but may be made up of more than two frames. Each frame fulfils thermal deformation absorbing capacity as an arm. The length, the width and the shape of each arm (frame) may be selected or determined as appropriate. In addition, the arm may be branched as described above. This arrangement allows the rigidity of the arm to be improved to the extent that the thermal deformability is not hindered. Although the plurality of frames are deformed in different shapes, the arm section performs as a whole the function of absorbing thermal deformation.

Variation 2

Figure 4:
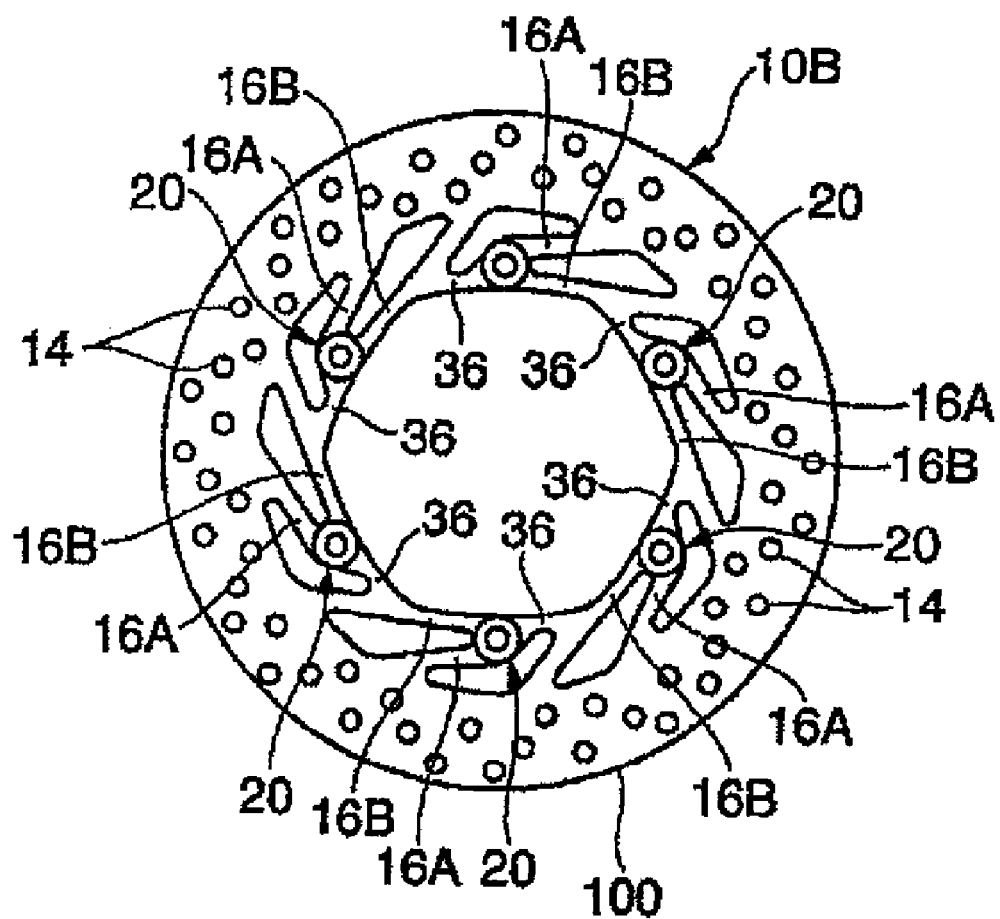
FIG. 4 is a front view of a brake disc of variation 2 according to the embodiment of this invention.

For the purpose of increasing the strength of the brake disc, the arm may be branched. As shown in FIG. 4, a brake disc 10B of this variation 2 is characterized in that a fixing portion 20 and an arm 16B, adjacent to the fixing portion 20, for supporting the fixing portion 20 are connected by a reinforcement frame (reinforcement arm 36). That is, the reinforcement frame 36 branches off from the arm 16B. The reinforcement frame is also deformed in association with the deformation of the arm 16B. In addition, the reinforcement frame (branched portion) connects one fixing portion 20 to another fixing portion 20 adjacent there to improve the rigidity of the fixing portion. The reinforcement frame has a length shorter than that of the arm 16B.

This reinforcement frame 36 allows the rigidity of the arm 16B to be improved better than that of the variation 1 to the extent that the thermal deformability is not hindered. This reinforcement frame 36 does not constitute a conventional hub, but deforms in association with the thermal expansion and deformation of the braking section. Therefore, the strength of the brake disc 10B against deviation or warping due to an external shock (for example, a tumble or the like) onto the brake disc 100, can be increased. If only the reinforcement frame 36 satisfactorily connects the adjacent arms 16B, then it may correspondingly have a minimum width and a shape. The shape, width and the like of the reinforcement frame 36 are determined so as to substantially maintain the deformability of the arm 16B.

The branched structure of the arm is not limited to those in FIG. 3 and FIG. 4. The number of branching and the shape of branching are determined as appropriate. The destination toward which the arm is branched may be the braking section 100 in addition to the adjacent fixing portion 20. For example, in the arrangement shown in FIG. 1, it is possible that an arm 16 extending from one fixing portion 20 is connected to a fixing portion 20 located in one side direction (S1) of the one fixing portion 20 through a reinforcement frame 36. This arrangement corresponds to the example shown in FIG. 4 with arms 16A eliminated.

As shown in FIG. 4, when two or more arms 16 (16A, 16B) are provided extending from one mounting portion 20, it is preferable that arms of different lengths are included and at least one arm (16A) other than a shortest arm (16B) is connected, through a reinforcement frame 36, to a fixing portion 20 located in one side direction (S1) of the one fixing portion 20. This is because a larger amount of deformation can be achieved when the reinforcement frame 36 is attached to the arm 16B longer than the shortest arm 16A than when the reinforcement frame 36 is attached to the shortest arm 16A.

In the arrangement shown in FIG. 4, the opening defined by fixing portions (mounting portions) 20, arms (connecting arms) 16B and reinforcement frames (reinforcement arms) 36, is in the shape of a polygon rather than a circle and located centrally of the brake disc. In this example, six mounting holes 18 are provided and the opening is approximately a regular hexagon. Here, the term "regular hexagon" refers, not limited to a geometrical regular hexagon, to a shape which can be regarded as approximately a regular hexagon even when it has round corners, or sides of no straight line segments to be exact. The shape of the opening can be approximately a polygon (for example, approximately a square) rather than approximately a regular hexagon depending on the configuration of the brake disc.

Figure 5:
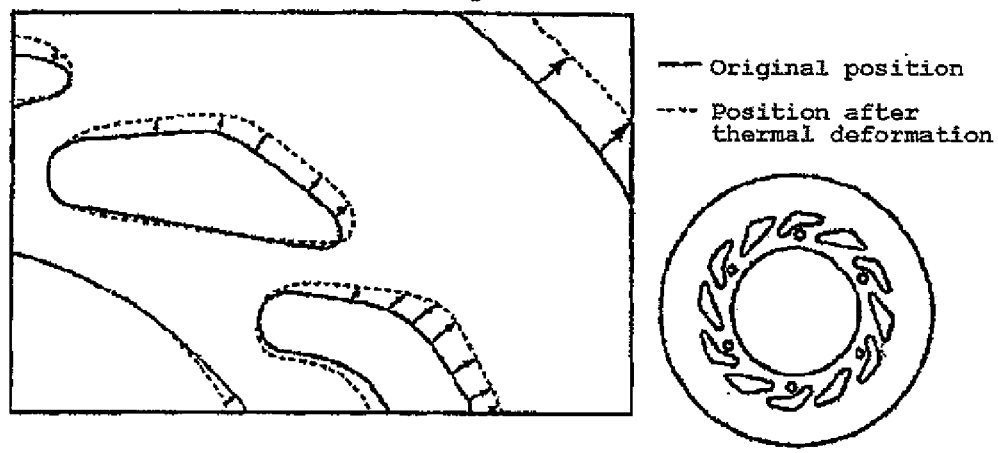
FIG. 5(A) shows a simulated characteristic, illustrating the amount of deformation of a portion of a brake disc for comparison.
FIG. 5(B) shows a simulated characteristic, illustrating the amount of deformation of a portion of the brake disc of variation 2.
Figure 5:
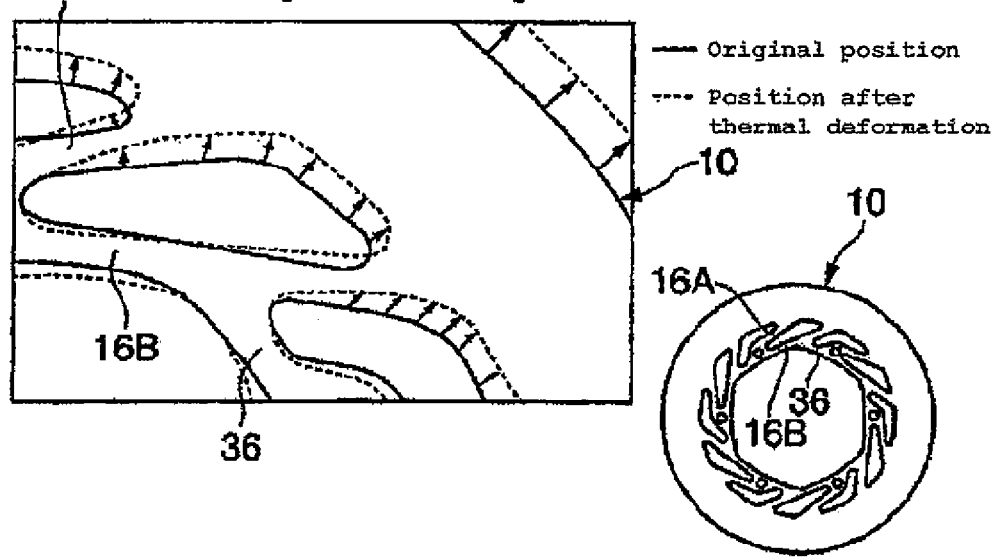

FIG. 5 shows characteristic drawings in which conditions of deformation due to frictional heat are simulated between a brake disc as a comparative example (see, FIG. 5(A)) and the brake disc 10B of the variation 2 (see FIG. 5(B)). The comparative example of FIG. 5(A) is a brake disk having a hub section of a circular inside circumference.

Figure 9:
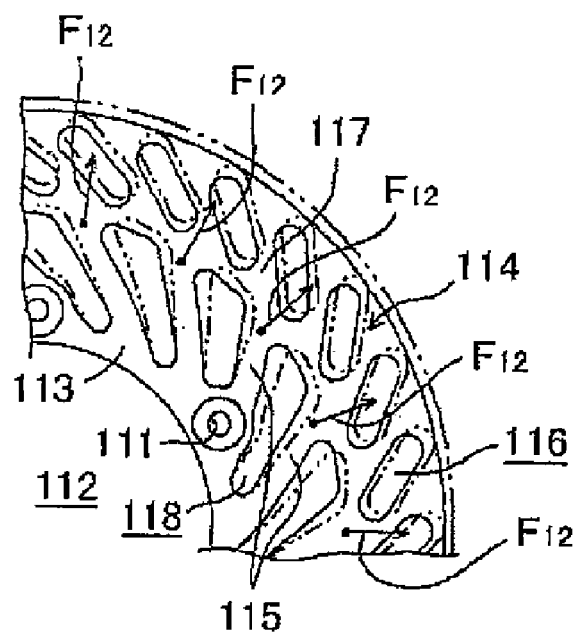
FIGS. 9(A) and 9(B) are views, illustrating the operation of the conventional brake disc.
Figure 9:
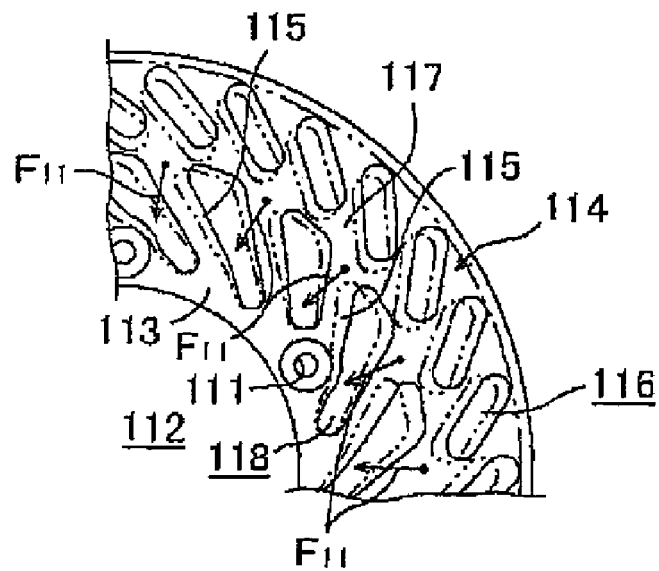

As shown in FIG. 5(A), in comparison with the amount of deformation of the region corresponding to the frames 16A, 16B in the brake disc of the comparative example, that of the frames 16A, 16B in the variation 2 increases by 30-50%. Since the variation 2 shows an amount of deformation larger than that of the comparative example, the brake disc of the variation 2 is correspondingly less susceptible to the thermal stresses due to thermal expansion by the frictional heat. Further, while the region of the connecting frame is deformed in the variation 2, the deformability of the annular hub in the comparative example shows a small value. This is because while in the variation 2, the disc has so-called nodes and is easy to deform, the disc of the comparative example has a circular hub without nodes and is substantially prevented from deforming. In the examples shown in FIGS. 9(A) and (B), since one object is to suppress deformation of the annular hub rather than to decrease the amount of deformation, there is no deformation as shown in the figures and it must be very small, if any.

Figure 6:
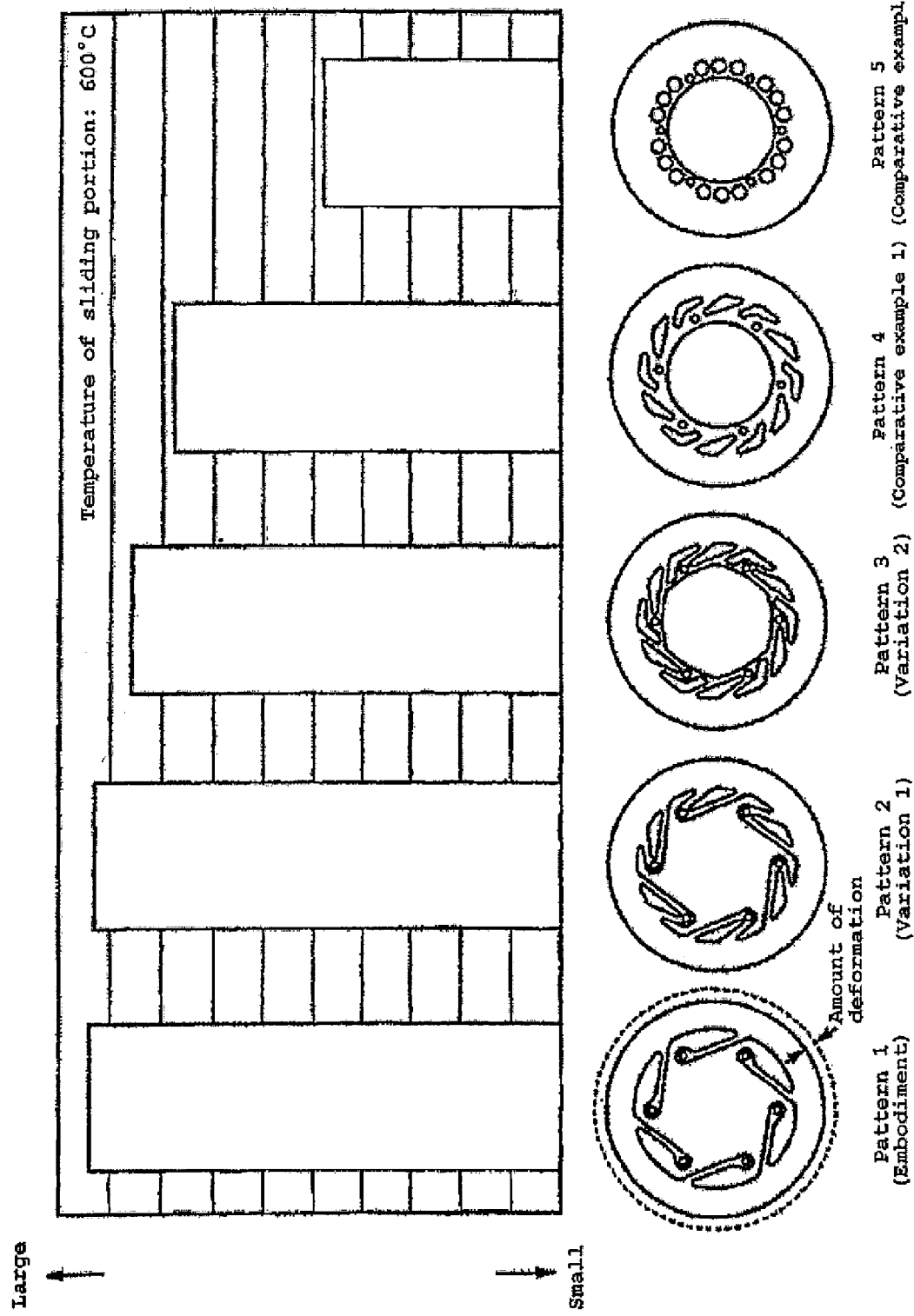
FIG. 6 shows a characteristic, illustrating the amount of deformation of the outside circumference for the brake discs of patterns 1-5.

In FIG. 6 is shown the calculation value (value obtained by simulation) of the amount of deformation of the outside circumference in each of the brake discs of FIGS. 1, 3 and 4 and two kinds of the brake discs of comparative examples (comparative example 1 and comparative example 2). One division of the vertical scale of FIG. 6 represents the amount of deformation of 0.1 mm, with the bottom line showing 0 mm and the top line 1.0 mm.

As is apparent from FIG. 6, amounts of deformation for patterns 1-3 are larger and the disc of pattern 1 (the pattern in FIG. 1) shows the largest. Amounts of deformation for patterns 4, 5 of the comparative examples 1, 2 are smaller and the disc of pattern 5 shows the smallest. Although the amount of deformation for the pattern 4 is larger than that for the pattern 5 as can be seen from FIG. 6, because of the presence of a hub section of a circular inside circumference, it is difficult to increase the amount of deformation further for mechanical reasons. If the structures of patterns 1-3 are adopted in place of the hub section, an increase in the amount of deformation can be effected. The larger the amount of deformation, the more easily the disc is elastically deformed in association with thermal expansion of the braking section.

Figure 7:
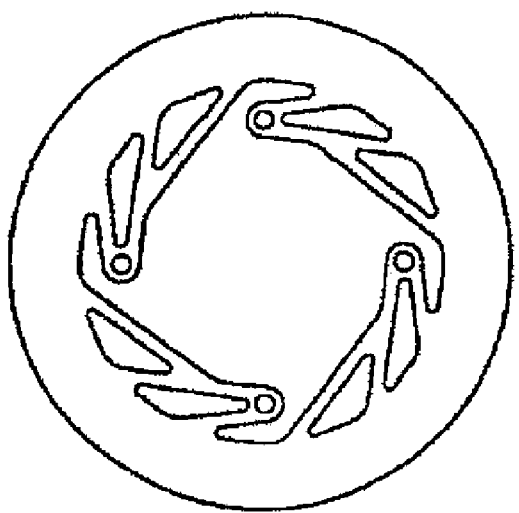
FIGS. 7(A) and 7(B) are front views of brake discs of the four-point fixing type.
Figure 7:

Although in this embodiment, fixing portions 20 are provided at six points, the number of the fixing points is not limited to that but three- or four-point fixing may be adopted. FIGS. 7(A) and (B) are front views of brake discs of four-point fixing type. FIG. 7(A) shows an example in which a branched portion is provided in the middle of each arm. In the example of FIG. 7(A), there is no reinforcement frame. On the other hand, FIG. 7(B) shows an example of FIG. 7(A) where reinforcement frames are provided.

As described above, since a plurality of arms 16 are provided for connecting a fixing section 20 for the attachment of a brake disc 10 to a wheel 12 and a braking section 100 of the disc brake 10 and each arm 16 is provided not through the intermediary of an annular hub section, arms are elastically deformed in association with the thermal expansion and deformation of the braking section 100, so that distortion-related stress is prevented from being applied to the disc brake.

While this invention has been described in its preferred embodiment, the description is not for restrictive purposes and it should be understood that various changes and modifications are possible.

Although the technical concept is different from the embodiment of this invention, a brake disc with an annular hub eliminated is disclosed in JP-A-Hei 11-22761 (applicant: Yamaha Hatsudoki Kabushiki Kaisha). The brake disc of this publication assigned to the present applicant has a structure shown in FIG. 10. A brake disc 200 shown in FIG. 10 has been designed to improve its strength better than that of the brake disc 110 shown in FIG. 8 and in this respect, it is different from the brake disc according to the embodiment of this invention.

Figure 10:
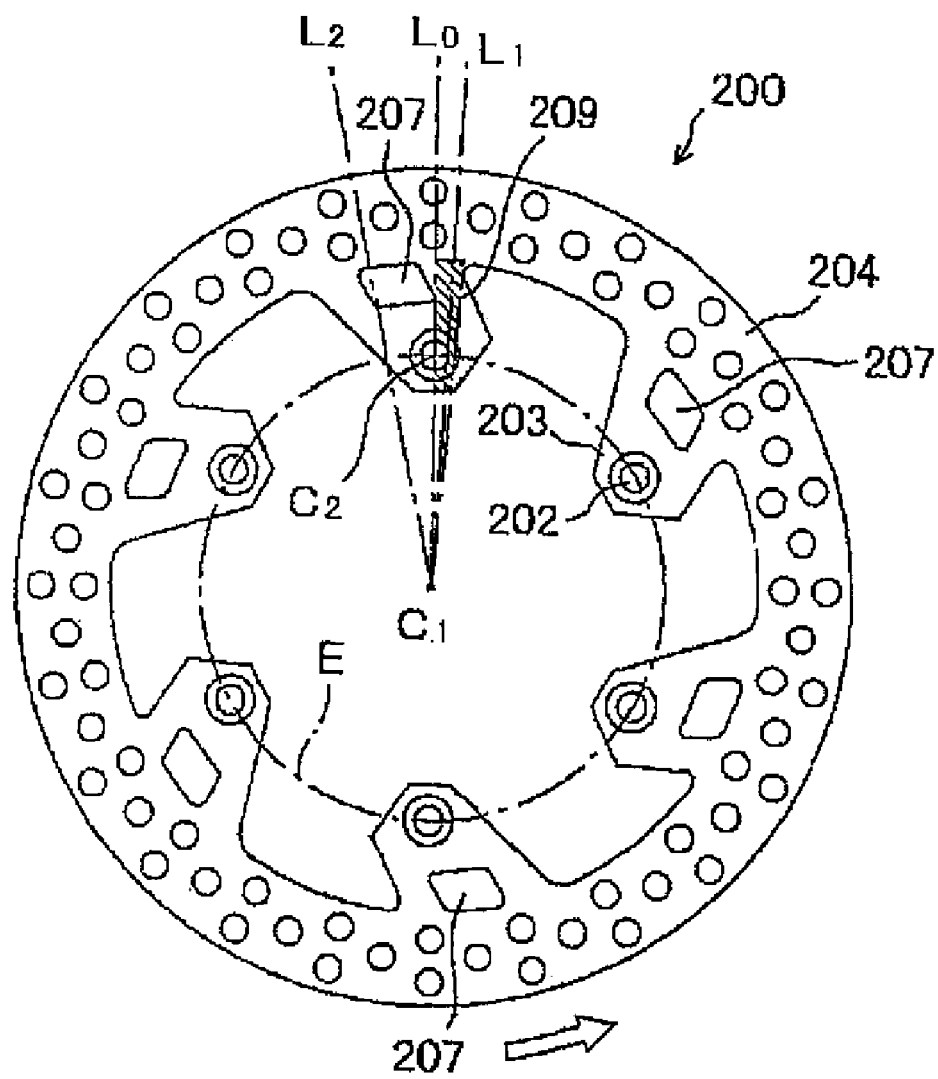
FIG. 10 is a front view of a conventional brake disc.

The structure of the brake disc 200 shown in FIG. 10 is such that a plurality of mounting holes 202 are formed on the circumference E of the mounting section 203, a braking section 204 is provided in the outside circumferential portion, and a plurality of openings 207 are provided radially outwardly of the mounting holes 202 and radially inwardly of the braking section 204. Near each mounting hole and along a radial straight line (L1) located at one side of a radial straight line L0 connecting the disc center C1 and the center C2 of each mounting hole is formed a continuous portion 209 of non-opening and on a radial straight line L2 located at the other side of the radial straight line L0, an opening 207.

While the brake disc 200 is formed with such a non-opening continuous portion 209 along the radial straight line (L1) to improve its strength, the brake disc according to the embodiment of this invention is different from the brake disc 200 in that no such non-opening continuous portion is provided extending along the radial straight line (L1), and widely different in that improvement in strength, if required, is achieved not by the provision of such a non-opening continuous portion but by the configuration of the whole brake disc.

According to the invention, a brake disc capable of absorbing sufficiently thermal stress associated with thermal expansion and deformation of the braking section and a vehicle equipped with such a brake disc are provided.

The invention claimed is:
1. A brake disc comprising:
an annular braking section for brake pads to be brought into sliding contact therewith; and
a plurality of connecting arms formed integrally with the braking section, each connecting arm extending from one end at an inside circumferential edge of the annular braking section to another end with a mounting hole formed therein, wherein
each connecting arm extends separately and their mounting holes are not directly connected,
each connecting arm extends in a direction that is approximately perpendicular to a radial line of the brake disc,
each connecting arm comprises a plurality of frame members, and
a frame member of one connecting arm is coupled to the another end of an adjacent connecting arm through a reinforcement frame.

2. A brake disc according to claim 1, wherein each connecting arm comprises two frame members.

3. A brake disc according to claim 2, wherein the two frame members are arranged in a triangular shape.

4. A brake disc according to claim 1, wherein each connecting arm is inclined towards a same side relative to the braking section.

5. A brake disc according to claim 4, wherein the connecting arms are inclined tangentially or approximately tangentially to a center of the brake disc.

6. A vehicle comprising a wheel and the brake disc according to claim 1, wherein the brake disc is attached to an axle of the wheel of the vehicle via screws provided in the mounting holes.

7. A vehicle according to claim 6, wherein the vehicle is a motorcycle.

8. A brake disc according to claim 1, wherein there are six connecting arms spaced equidistantly around the inside circumferential edge of the annular braking section.

9. A brake disc according to claim 1, wherein a plurality of holes are formed in the annular braking section to provide a heat release function during braking.

10. A brake disc according to claim 1, wherein each connecting arm has a width that is less than a diameter of its mounting hole.

11. A brake disc according to claim 1, wherein each connecting arm has a length that is longer than its width.

12. A brake disc comprising:
an annular braking section for brake pads to be brought into sliding contact therewith; and
a plurality of connecting arms formed integrally with the braking section, each connecting arm extending from one end at an inside circumferential edge of the annular braking section to another end with a mounting hole formed therein, wherein
each connecting arm extends separately and their respective another ends are not directly connected,
each connecting arm extends in a direction that is approximately perpendicular to a radial line of the brake disc,
each connecting arm comprises a plurality of frame members, and
a frame member of one connecting arm is coupled to the another end of an adjacent connecting arm through a reinforcement frame.

* * * * *